United States Patent [19]
Janky et al.

[11] Patent Number: 6,166,626
[45] Date of Patent: *Dec. 26, 2000

[54] CLANDESTINE MISSING VEHICLE LOCATION REPORTING USING CELLULAR CHANNELS

[75] Inventors: James M. Janky; Hamid Najafi, both of Los Altos; John F. Schipper, Palto Alto, all of Calif.

[73] Assignee: Trimble Navigation Limited, Sunnyvale, Calif.

[*] Notice: This patent is subject to a terminal disclaimer.

[21] Appl. No.: 09/361,350

[22] Filed: Jul. 26, 1999

Related U.S. Application Data

[63] Continuation of application No. 08/814,982, Mar. 11, 1997, Pat. No. 5,929,752, which is a continuation-in-part of application No. 08/443,235, May 17, 1995, Pat. No. 5,629,693, which is a continuation-in-part of application No. 08/157,726, Nov. 24, 1993, abandoned.

[51] Int. Cl.[7] ................................................. B60R 25/10

[52] U.S. Cl. .......................... 340/426; 342/457; 455/422; 340/988

[58] Field of Search ..................... 340/426, 539, 340/988, 989, 991, 993, 990; 342/357.01, 457, 357.07; 180/287; 307/10.1, 10.2; 379/58, 59, 106, 107; 455/445, 456, 458, 422

[56] References Cited

U.S. PATENT DOCUMENTS

| | | | |
|---|---|---|---|
| 5,043,736 | 8/1991 | Darnell et al. | 342/357.1 |
| 5,155,689 | 10/1992 | Wortham | 340/990 |
| 5,208,756 | 5/1993 | Song | 340/991 |
| 5,223,844 | 6/1993 | Mansell et al. | 342/357 |
| 5,299,132 | 3/1994 | Wortham | 340/990 |
| 5,334,974 | 8/1994 | Simms et al. | 340/990 |
| 5,389,934 | 2/1995 | Kass | 342/357.07 |
| 5,398,190 | 3/1995 | Wortham | 340/990 |
| 5,418,537 | 5/1995 | Bird | 342/357.09 |
| 5,513,111 | 4/1996 | Wortham | 340/990 |
| 5,515,419 | 5/1996 | Sheffer | 340/539 |
| 5,519,621 | 5/1996 | Wortham | 340/989 |
| 5,557,254 | 9/1996 | Johnson et al. | 340/426 |
| 5,629,693 | 5/1997 | Janky et al. | 340/988 |
| 5,669,061 | 9/1997 | Schipper | 455/429 |
| 5,673,305 | 9/1997 | Ross | 340/426 |
| 5,682,133 | 10/1997 | Johnson et al. | 340/426 |
| 5,777,580 | 7/1998 | Janky et al. | 342/457 |
| 5,786,789 | 7/1998 | Janky | 342/357.1 |
| 5,918,183 | 6/1999 | Janky et al. | 340/825.31 |
| 5,929,752 | 7/1999 | Janky et al. | 340/426 |

FOREIGN PATENT DOCUMENTS

WO8912835  12/1989  European Pat. Off. .

*Primary Examiner*—Jeffery A. Hofsass
*Assistant Examiner*—Van T. Trieu
*Attorney, Agent, or Firm*—Cooper & Dunham LLP

[57] ABSTRACT

Apparatus and method for a location determination and reporting (LDR) system for clandestinely determining and reporting a missing vehicle present location. The vehicle is equipped with a handheld cellular phone unit and controller that are accepted and held by a cellular phone cradle that can include electrical poster and/or a location determination (LD) unit to determines the LD unit present location. The cellular phone unit can operate on one cellular channel or on two distinct cellular channels. When the vehicle is reported missing, the central station interrogates the vehicle LDR system to determine the vehicle present location. A location interrogation signal is transmitted, commanding the LD unit to transmit its present location. The cellular phone does not signal receipt of an incoming call for an initial time period of selected length Δtd, awaiting possible receipt of a location interrogation signal on the first cellular channel. If the incoming call includes a location interrogation signal, the cellular phone does not "ring" but transmits information on the vehicle's present location to the central station. If the incoming call does not include a location interrogation signal, the cellular phone "rings" audibly or visually, after the initial time delay, and behaves as a normal cellular phone for that call on the second cellular channel. The cellular phone functions normally if a vehicle occupant attempts to use the phone. An unauthorized user of the vehicle receives no indication that the innocuous cellular phone is used to track the vehicle present location.

22 Claims, 6 Drawing Sheets

CLANDESTINE MISSING VEHICLE LOCATION REPORTING USING CELLULAR CHANNELS

FIELD OF THE INVENTION

This application is a continuation of a patent application entitled "Clandestine Location Reporting For Missing Vehicles," U.S. Ser. No. 08/814,982, now U.S. Pat. No. 5,929,752 filed Mar. 11, 1997 and U.S. Ser. No. 08/443,235 filed May 17, 1995 now U.S. Pat. No. 5,629,693, which was a continuation in part of abandoned application Ser. No. 08/157,726, filed Nov. 24, 1993, both assigned to the assignee of this application. This invention relates to clandestine use of location determination systems, such as the Global Positioning System or Loran, to monitor and report on the location of a missing vehicle, using cellular phone channels.

BACKGROUND OF THE INVENTION

As used herein, the term "vehicle" refers to land vehicles, to marine vehicles or vessels, and to aircraft. In the United States, about 1.7 million automotive vehicles and about 100,000 marine and aircraft vehicles are reported missing (or stolen) each year. The probability that a land or marine vehicle will be recovered drops dramatically after the vehicle or vessel has been missing for 24 hours or more. Thus, time is of the essence in locating and retrieving a missing vehicle.

Vehicle location and/or tracking systems are disclosed by Shelfer et al in U.S. Pat. Nos. 4,891,650 and 5,218,367, by Darnell et al in U.S. Pat. No. 5,043,736, by Durboraw in U.S. Pat. No. 5,119,341, by Wortham in U.S. Pat. Nos. 5,155,689 and 5,398,190, by Robinson et al in U.S. Pat. No. 5,159,344, by Bertiger et al in U.S. Pat. No. 5,187,805, by Song in U.S. Pat. No. 5,208,756, by Mansell in U.S. Pat. No. 5,223,844, by Dennison in U.S. Pat. No. 5,235,633, and by Simms et al in U.S. Pat. No. 5,334,974.

What is needed is a system including cellular telecommunication means that allows determination and reporting of the present location of a missing vehicle, using clandestine means on the vehicle itself and one or more cellular phone channels. Preferably, the clandestine means permits normal operation of the cellphone, regardless of who is using the vehicle or phone, but can be used to determine and transmit a report on the present location of the missing vehicle, if commanded to do so by a special message sent via the cellular network. Preferably, the system will optionally allow simultaneous use of the cellular phone system to report vehicle location and to carry a normal cellular phone conversation. Preferably, the system should allow recording of any telecommunications made using the cellular phone while the vehicle is missing.

SUMMARY OF THE INVENTION

These needs are met by the invention, which provides a location determination and reporting (LDR) system for clandestinely determining and reporting on the present location of a missing vehicle. The vehicle may be motion or may be motionless when its location is determined and reported, and the vehicle may be anywhere within reach of a cellular phone station to which the vehicle location is reported. The clandestine reporting system may be activated or disabled by appropriate command using the cellphone keypad or remotely.

A vehicle is equipped with an operating cellular telephone (the term as used herein includes a PDS telephone), with a location determination (LD) unit, including an LD signal antenna and LD signal receiver/processor (preferably hidden on the vehicle), that determines the present location of the LD unit, with a call interceptor that may be part of the cellular phone, and with a cellular telephone/LD unit controller and interface. When the vehicle is reported missing, stolen or moved without authorization from its last known resting place, the vehicle owner himself from home, or from a service agency hired by the owner to track the vehicle from an originating station, uses the cellular telephone facility to place a call to the cellphone in the vehicle and transmit an interrogation signal. The interrogation signal activates a reporting procedure that reports the present location of the vehicle, even if the vehicle, is presently in motion. The owner, agent or other interested and authorized person makes a phone call to the cellular phone unit in the vehicle and transmits a location interrogation message that commands the LD signal receiver/processor to provide information on the present location of the LD unit for transmission by the vehicle cellular phone unit to whoever placed the call, where the owner, tracking agent or police are waiting to receive this location information.

When the vehicle cellular phone is contacted and the clandestine vehicle tracking mode is activated, the phone will not immediately signal receipt of an incoming call. The incoming call is first received by a call interceptor, connected to the cellular phone, imposing an initial time delay interval of selected length $\Delta t_d$ ($\Delta t_d \approx 0.2$–30 sec, preferably $\Delta t_d \approx 1$–5 sec, and more. preferably $\Delta t_d \leq 1$ sec), and awaiting receipt of an anticipated location interrogation signal from the originating station that requests that the cellular phone unit provide present location information for the vehicle.

If the call interceptor or cellular phone receives this location interrogation signal within the initial time interval of length $\Delta t_d$, the call interceptor suppresses ringing by the cellular phone in the usual sense; the cellular phone provides no indication to occupants of the vehicle that the phone is communicating with the designated station; and the cellular phone transmits information on the vehicle's present location to the call originator.

However, if the anticipated location interrogation signal is not received within the initial time interval of length $\Delta t_d$, the call interceptor allows the cellular phone to ring audibly or to signal visually, after a tine delay of length $\Delta t_d$. The call interceptor then enables normal operation of the cellphone.

When the system operates in a clandestine tracking mode, the controller and cellular phone in the vehicle answer any incoming phone call with a simulated ringing at the caller's end, to avoid alerting any caller to the unusual nature of this phone system. If the incoming call is not a location interrogation signal, the cellular phone handset produces a standard audible ringing tone or equivalent visual signal (a "ringer" signal) within the vehicle, and a vehicle occupant can respond to the incoming phone in a normal manner. If the incoming phone call is not answered, the controller and cellular phone will continue to transmit the sounds of simulated ringing or actual ringing for the benefit of the caller, until the caller disconnects, or until a selected large number of rings, such as 10 or 20, has occurred.

The cellular phone channel used to contact and interrogate the vehicle cellular phone and LD unit corresponds to a first mobile identification number (MIN). The cellular phone may function normally, using the first MIN channel or using an optional second MIN channel assigned to the cellular phone, if a person in the vehicle attempts to use the cellular phone. This "normal" use of the cellular phone will temporarily pre-empt use of the cellular phone to respond to a location interrogation signal, in one embodiment. Thus, an unauthorized user of the vehicle receives no warning or indication that the innocuous cellular phone in the vehicle is being used, or can be used, to track the present location of the vehicle. If one or more phone calls is received by or made from the vehicle while the vehicle is missing, the cellular phone unit and controller can record the telephone number of the calling or called person and/or the voice communication itself during this period, and can transmit this recorded information upon receipt from the originating station of a voice communication interrogation signal. Alternatively, location interrogation and normal cellular phone use may occur on the same MIN channel. The cellular phone may be permanently mounted or may be handheld or otherwise portable. Where a handheld cellular unit is provided, the call interceptor functionality is built into the phone.

Alternatively, the cellular phone can be disabled and rendered unusable unless affirmative action is taken by the vehicle owner or authorized operator, by toggling a concealed switch or entering a confidential alphanumeric symbol sequence into a microprocessor associated with the call interceptor and phone controller, using an on-board keypad.

Alternatively, the cellular phone may operate on the first MIN channel for location interrogation (preferably initiatable only from the originating station or the owner's home, if the owner is equipped to decode and make use of the location information) and may operate on a second, separate MIN channel for normal cellular phone activities.

In addition to tracking personal property like automobiles, this invention is also well suited to tracking other types of high value cargo in vehicles that may have been hijacked and must be tracked in some stealthy manner so that the thieves are not aware that the vehicle is being tracked. The cellular phone can be located in the cab just as it might be in a personal vehicle, or it can be located in some less obvious and more secure location, such as the trailer or cargo hold of the vehicle.

DESCRIPTION OF BEST MODE OF THE INVENTION

Figure 1:
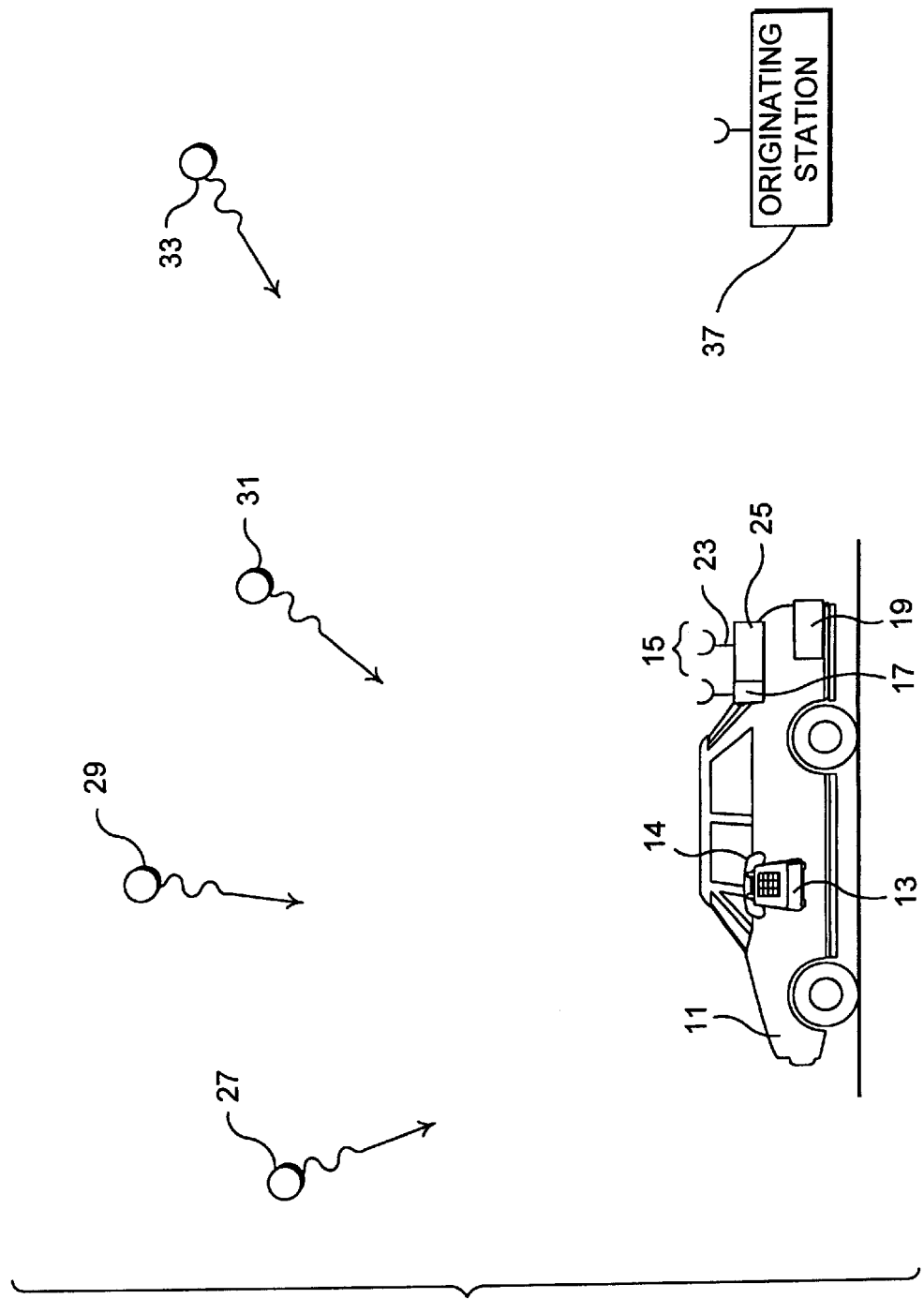
FIG. 1 is a schematic view illustrating use of one embodiment of the invention for determining the location of a land vehicle, using an LD system.

FIG. 1 illustrates use of the invention to monitor and report on the location of a land vehicle 11, using a satellite-based or ground-based LD system. A cellular telephone unit 13, an LD unit 15 and a call interceptor 17 (including a specially programmed microprocessor) are installed in the vehicle 11. The cellular phone unit 13 is placed in plain sight of, and within the reach of, an operator of the vehicle 11, as a normal cellular phone would be. The cellular phone 13 is connected to a power supply 19 and either operates normally or simulates operation as a normal cellular phone (when in the clandestine mode) for most purposes. The LD unit 15, preferably hidden from view on the vehicle 11, may include an LD signal antenna 23 and associated LD signal receiver/processor 25 that receive LD signals from three or more LD system signal sources 27, 29, 31, 33 and determine the present location of the LD unit (usually, of the LD antenna), either continuously or periodically or upon demand. The cellular phone unit 13, LD unit 15 and call interceptor 17 (also preferably hidden from view on the vehicle) together form a location determination and reporting (LDR) unit that may be used to practice the invention in one embodiment.

The cellular phone unit 13 receives incoming calls and places outgoing calls through the call interceptor 17, which (1) receives cellular phone messages through the cellular phone and (2) delays audible or visual signaling of receipt of an incoming call to a vehicle occupant by the cellular phone for a period of time $\Delta t_d$, ($\Delta t_d \approx 0.2$–30 sec, preferably $\Delta t_d \leq 1$ sec) to determine whether the cellular phone message includes a location interrogation signal or is a normal cellular phone signal. However, the call interceptor 17 and/or cellular phone unit 13 produces a simulated ringing at the caller's end, for the benefit of the caller (only) on an incoming call, to avoid alerting the caller that the cellular phone has another purpose. If the incoming call is not a location interrogation signal, after the time-out interval of length $\Delta t_d$ the cellular phone handset receives a standard audible or visual ringer signal, and a vehicle occupant can respond to the incoming phone call in a normal manner. If the incoming phone call is not answered (i.e., if the cellular phone unit does not go off-hook), the call interceptor 17 and/or cellular phone unit 13 will continue to transmit the sounds of simulated ringing or actual ringing for the benefit of the caller, until the caller disconnects or a specified number of rings occurs, after which the call interceptor controller disconnects the phone, as if it were a dropped call, lost by the cellular base station. This is referred to as a "spoofing" operation.

If the cellular phone message is a normal message, the call interceptor 17 (3A) allows the cellular phone unit 13 to ring and to function a normal cellular phone. If an occupant in the vehicle 11 answers the cellular phone 13 as a result of receipt of an incoming call signal, the cellular phone exhibits normal cellular phone behavior. If an occupant in the vehicle 11 uses the cellular phone 13 to place an outgoing phone call, the cellular phone will also exhibit normal cellular phone behavior in most circumstances.

However, if the signal received on the cellular phone 13 includes a location interrogation signal (sent from an originating station or some other appropriately equipped central location), the call interceptor 17 will: (3B) suppress any production of an incoming call cellphone ringer signal within the vehicle 11 by the cellular phone and send a location determination command signal to the LD unit 15; (4B) receive present location information allowing determination of the present location and/or time of observation of the LD unit 15 from the LD unit; (5B) cause the cellular phone 13 to transmit this present location information to the originating station 37 (or to another designated information-receiving facility) for analysis and (optionally) further signal processing; and (6B) optionally sever the phone connection between the cellular phone 13 and the originating station 37 after the present location information is received by the originating station. The present location information transmitted by the cellular phone 13 can include the present location coordinates of the vehicle 11, or the unprocessed signals received by the LD unit 15 at the time the call interceptor 17 issues the location determination command, or can include present location information that is unprocessed or has been partly processed by the LD signal receiver/processor 25.

If an occupant in the vehicle 11 picks up the handset 14 for the cellular phone 13 and attempts to make a cellular phone call, while location determination information is being received from the LD unit 15 and transmitted to the originating station 37, the call interceptor 17 will: (1) suppress transmission of the remainder of the location determination information, immediately or after a selected time delay of no more than 1 sec (preferably, no more than 0.2 sec); (2) optionally transmit a message-abort signal to the originating station 37; (3) optionally store the remainder of the vehicle present location information in an associated memory unit; (4A) optionally allow the person with the cellular phone handset to place and conduct a normal cellular phone call; and (5A) optionally cause the cellular phone to transmit the remainder of the location determination information to the originating station 37, after the vehicle occupant has completed that call, if the call interceptor 17 or cellular phone 13 supplies the cellular phone network number of the originating station 37. As an alternative to step (5A), the call interceptor 17 may (5B) issue another location determination command to the LD unit 15 and cause the cellular phone 13 to transmit a new present location message to the originating station 37, after the cellular phone handset has been replaced on its cradle. As an alternative to step (4A), the cellular phone handset may behave as if it is disabled so that the vehicle occupant cannot initiate and complete an outgoing phone call using the cellular phone 13.

Optionally, the call interceptor 17 can record and store any telecommunications made by the cellular phone 13 either (1) after the LD unit 15 receives a location interrogation signal or (2) at any time, unless this recording capability is explicitly disabled (temporarily) by a disable message (confidentially held by the vehicle owner) entered into the call interceptor. If such telecommunication is recorded, the originating station 37 is optionally notified by receipt of a voice or electronic communication advisory signal from the cellular phone 13 (1) that the cellular phone has been used to communicate with a phone other than the originating station phone and (2) that the phone number of this other phone and/or the voice communication itself has been recorded. The originating station 37 optionally can then transmit a voice or electronic communication interrogation signal to the cellular phone 13, and a digital, analog or audio record of this recorded information can be transmitted to the originating station by the cellular phone, after the vehicle occupant has completed the call and is no longer using the cellular phone. The originating station 37 can transmit a voice communication interrogation signal to the cellular phone unit 13, whether or not the originating station has received a voice communication advisory signal.

Handheld devices for converting voice signals to digital form, or from digital form to voice form, and storing these signals are now available widely. For example, The Sharper Image Catalog, San Francisco, October 1996, pages 29, 41, 71 and 84 (back cover) displays and lists features available for the Total Recall 23, the Voice Pager Organizer, the Memo Manager and the Machina Cardcorder 6000 devices, respectively, all of which perform such conversions and provide other features as well.

Figure 2:
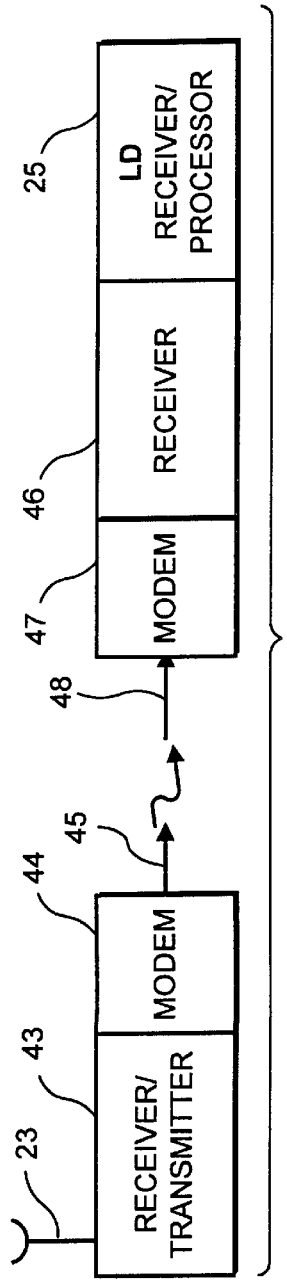
FIGS. 2 and 3 are schematic views illustrating use of an infrared or other short distance electronic link to communicate LD information.

In an alternative embodiment, the LD signal antenna 23 is mounted in or on the vehicle 11 and communicates with the LD signal receiver/processor 25, using a short range, wireless communications link 42 that connects the LD antenna 23 and the LD receiver/processor 25, as illustrated in FIG. 2. The communications link 42 includes a receiver/transmitter 43, a modem 44 (optional) and a data bus 45 (optional) connected to the LD signal antenna 23, and includes a receiver 46, a modem 47 (optional) and a data bus 48 (optional) connected to the LD signal receiver/processor 25. The LD signal information transmitted by the receiver/transmitter 43 and received by the receiver 46 may be low intensity infrared or radiowave signals that need not travel more than 1–20 feet (0.3–6 meters).

Figure 3:
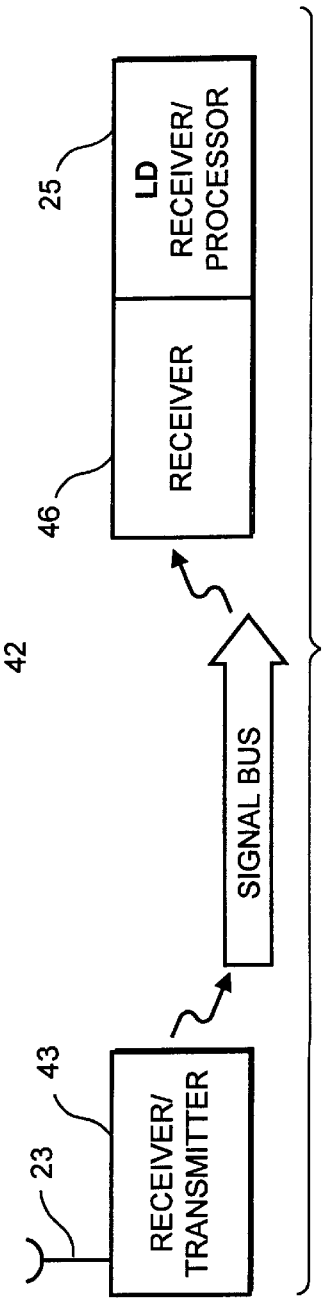

Optionally and alternatively, the communications link 42 may also include a signal bus 49 that (1) is separated from the LD antenna 23 and from the LD receiver/processor 25, (2) that receives LD signal information from the receiver/transmitter 43 and (3) that provides this LDS signal information for the receiver 46, as shown in FIG. 3.

Standards for signals transmitted by signal buses are set forth in the Joint Society of Automotive Engineers and TMC (organization name unknown) publications for J1587 (issued as 1988-01 and in revised form as 1994-01-10 and later revisions) and for J1708 (issued as 1986-01 and in revised form as 1990-10-05 and later revisions), incorporated by reference herein. The J1587 and J1708 publications recite standards and define signal formats for use of microcomputer systems in heavy duty vehicle applications, such as provision of electronic data on vehicle and component performance, vehicle routing and scheduling, vehicle driver information and vehicle cargo information. Each signal that is transmitted using a signal bus complying with these standards includes (1) a message identification (MID) no. (three digits, from 0–255), with MIDs 0-127 being defined in J1708 and MIDs 128-255 being defined by J1587, (2) one or more measured parameter values associated with and identified by the MID and (3) a checksum. The current set of 256 MIDs, including MID numbers held in reserve, are set forth in the J1587 document. Parameter update time intervals and priorities for transmission of different groups of MIDs are now being developed.

The cellular phone 13 may use a single channel, with one mobile identification number (MIN) assigned to this channel in a conventional manner. Alternatively, the cellular phone 13 may use two distinct MIN channels: a first MIN channel for location interrogation, which is preferably operable only from an originating station, not from the vehicle; and a second MIN channel that receives and places telephone calls in the vehicle, using the cellular phone in a conventional manner. Provision and use of two MIN cellular phone channels is discussed in EIA/PIA-553, published by electronic industries association, engineering department, 2001 Pennsylvania Avenue, NW, Washington, D.C., 20008 (9, 198). The preceding discussion assumes that only one MIN channel is available.

In a second approach, a first MIN channel is provided for location interrogation and reporting, and a second, distinct MIN channel is provided for normal cellular phone communications. The cellular phone does not require use of the cellular handset to respond to a location interrogation signal. In a first option using the second approach, the first MIN channel and the second MIN channel operate independently: receipt of and response to a location interrogation signal has no effect on receipt or initiation of a cellular phone communication by a vehicle occupant. In this first option to the second approach, the first and second MIN cellular phone channels are preferably supplied by separate power supplies so that use of one MIN channel will not diminish the power available for use of the other MIN channel. Use of the first MIN channel requires use of a first power supply 107 in FIG. 5, discussed below, and the second MIN channel preferably uses a second power supply 109 in FIG. 5. In a second option to the second approach, the first and second MIN channels are powered at the vehicle end by a single power supply 107 in FIG. 5 that preferably has a larger maximum current drain so that use of the two channels simultaneously will not noticeably reduce the power available for operation on either channel.

Figure 4:
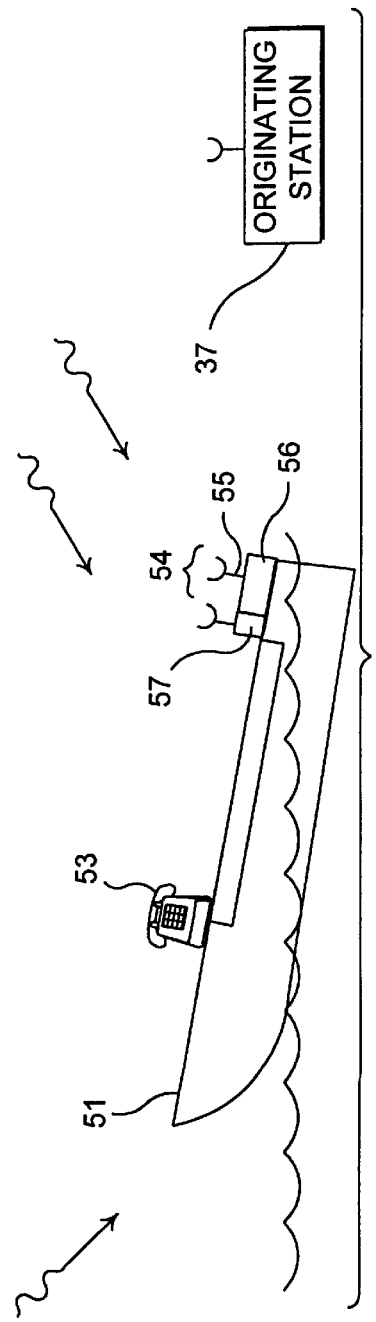
FIG. 4 is a schematic view illustrating use of one embodiment of the invention for determining the location of a marine vehicle, using an LD system.

FIG. 4 illustrates use of the invention in a second embodiment, wherein the LD signals are provided by a plurality of LD signal sources (not shown) and are received by an LD unit 54 that may include an LD signal antenna 55 and associated LD signal receiver/processor 56, carried in or on a marine (or airborne) vehicle 51. The LD unit 54 in FIG. 4 replaces the LD unit 15 in FIG. 1, and the system in FIG. 4 otherwise operates as does the system in FIG. 1. The LDR unit used to practice this embodiment includes a cellular phone unit 53, the LD unit 54 and a call interceptor 57.

Figure 5:
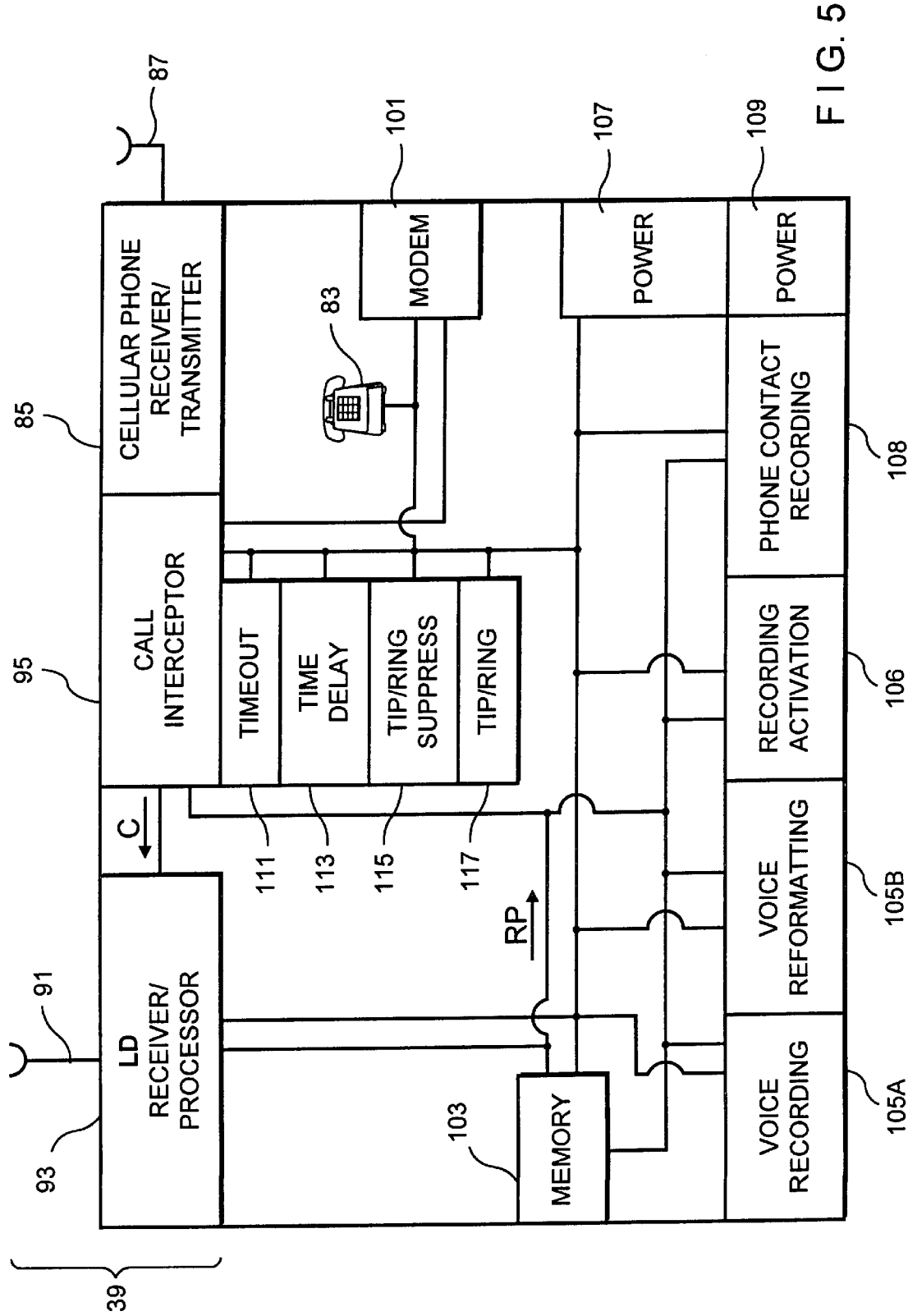
FIG. 5 is a schematic view of apparatus that may be installed in a vehicle for determining and reporting on the present location of the vehicle.

FIG. 5 illustrates an embodiment of an LDR unit 81 that can be used to practice the invention as indicated in FIGS. 1 and 4. The system 81 includes a cellular phone handset 83, radio receiver and transmitter 85 and radio antenna 87. These three components may be part of a conventional cellular phone, with other components shown in FIG. 5 being included in a retrofitted unit that is positioned between the handset 83 and the radio receiver and transmitter 85. Alternatively, all components of the LDR unit 81 can be integrated in a single compact package.

The LDR unit 81 also includes an LD unit 89 that may include an LD signal antenna 91 connected to an LD signal receiver/processor 93. A call interceptor 95 is connected to the handset 83 for audio signal exchange and to a modem 101 (optional) for signal transmission. The call interceptor 95 and the modem 101 are optionally configured to exchange audio and digital signals, respectively, with the radio receiver and transmitter 85.

The LDR unit 81 also includes an optional memory unit 103, for storing the remainder of an aborted LD unit present location information message. The LDR unit 81 also includes an optional voice recording module 105A, an optional voice reformatting module 105B and an optional recording activation switch 108, for recording any voice communication made over the vehicle cellular phone unit and/or for reformatting this recorded information in a form that can be transmitted as an analog or digital communication message to the originating station 37. The LDR unit 81 also includes an optional DTMF tone recording module 106 connected to the recording activation switch 108, for recording a telephone number contacted by a vehicle occupant in a normal outgoing phone call, including, if desired, the phone number of the originating station 37. A first power supply 107 and an optional second power supply 109 provide electrical power for one or more of the other components of the LDR unit 81.

In future versions of a cellular phone, the handset 83 shown in FIG. 5 may become a small, handheld, personal module to be carried around by an individual user. A handheld handset will require an electrical power port (unless the handset provides its own power) and a signal port to exchange audio messages, or digital or analog signals that are converted from or to audio signals within the handset itself. In this instance, a handheld handset 83 would plug into the remainder of the LDR unit 81 shown in FIG. 5. This remainder of the LDR unit 81 can be provided as modules retrofitted to a cellular phone radio receiver/transmitter 85; or this remainder can be provided as an integrated package to which the handset 83 is attached. Thus, the embodiment shown in FIG. 5 will accommodate handheld, carry-around cellular-phone handsets as well as the familiar cellular phone handset, radio receiver, radio antenna combinations that are attached to one another.

The call interceptor 95 may include a timeout mechanism 111 that, in response to an incoming cellphone call, changes from an inactive state to an active state. An associated clock or other time delay mechanism 113 begins a countdown over an initial time interval of length $\Delta t_d$. The call interceptor 95 receives a signal indicating which state the timeout mechanism 111 is in. If the timeout mechanism 111 is in an active state, a cellphone tip-and-ring suppressor 115 suppresses a cellphone tip-and-ring mechanism 117 and the cellphone handset 83 does not (yet) audibly "ring" to indicate that the cellphone unit is receiving an incoming call. During this initial time interval of length $\Delta t_d$, the incoming cellphone call is received and controlled by the call interceptor 95. The call interceptor 95 performs in this mode when the cellphone timeout mechanism 111 is activated and determines whether an incoming phone call includes an LD interrogation signal. The call interceptor thus incorporates an "auto answer" function, similar to what is used in a telephone answering machine.

If the call interceptor 95 senses the presence of an LD interrogation signal in the incoming cellphone call (within the initial time interval of length $\Delta t_d$), the LD interrogation controller sends a command signal C to the LE) unit 89. This command signal C commands the LD unit 89 to provide information on the present location of the LD unit 89, or of the LD signal antenna 91. The call interceptor 95 receives this present location information (LDI) and causes the cellphone radio receiver and transmitter 85 to transmit the present location information for the LD unit 89 to the originating station 37. The call interceptor 95, if it issues the command signal C, remains active while this present location information is being obtained and transmitted. Whether the LD interrogation signal is present or absent, the cellphone receiver and transmitter 85 or the call interceptor 95 continues to simulate a "ringing" signal, for the calling party only, during the initial time interval of length $\Delta t_d$. The calling party on a normal incoming cellphone call receives no indication that the called cellphone is performing in any manner other than as a normal cellular phone.

An LD interrogation signal may appear in the incoming cellphone signal as part or all of a preamble or header for this signal, analogous to the "start bits" that indicate the beginning of a message byte transmitted asynchronously. Alternatively, an LD interrogation signal may appear as part or all of the data segment of the incoming signal, or as part or all of a trailer of the incoming signal, analogous to the "stop bits" that indicate the end of a message byte transmitted asynchronously. An LD interrogation signal may be a particular ordered pattern P of zeroes and ones (digital signal) or of high/low amplitude and duration (analog signal). The call interceptor 95 searches for this LD interrogation signal by computing a time-shifted correlation value of the incoming call signal with a replica of the pattern P that is stored in the call interceptor, using a selected window size for computation of the correlation value. If this correlation value exceeds a selected threshold value for at least one time shift, an LD interrogation signal is determined to be present. If this correlation value does not exceed this selected threshold value for any shift in time, an LD interrogation signal is not present, and the incoming phone call is determined to be a normal phone call.

Alternatively, the interrogation signal can consist of a short series of DTMF tones originated from a touch tone phone, either by user input to a phone keyboard or by modem control from a personal computer with a program designed to make contact with a remote data source, for example, as part of the data reporting system in the mobile cellular reporting system. Such a computer system could also be part of the map matching system that transforms the coordinates sent by the clandestine reporting system as obtained by the LD system into locations on a map, readable by the tracking service agent or the owner of the vehicle. Map reading and map matching techniques are well known in the vehicle tracking arts.

Alternatively, the LD interrogation signal may be part of a control signal and/or caller identification sequence that is transmitted by the originating station 37 in the intervals between the conventional "ring" intervals. This approach for transmitting control and identification signals is disclosed by Bayerl et al in U.S. Pat. No. 5,396,548, incorporated by reference herein. If this approach is used, the conventional initial communication signals from the calling party (here, the originating station) are supplemented by an LD interrogation signal that is transmitted between "ringing signals" that are heard by (only) by the calling party.

If the initial portion (of temporal length $\Delta t_d$) of this incoming phone call does not include an LD interrogation signal, the call interceptor 95 receives a timeout signal from the time delay mechanism 113 and goes inactive after the initial time interval of length $\Delta t_d$. This causes the timeout mechanism 111 to become inactive. This inactivates the tip-and-ring suppressor 115 and allows the tip-and-ring mechanism 117 to begin "ringing" audibly, visually, tactually (by vibration), or in some other way, in the cellphone handset 83, to indicate to the vehicle occupants(s) the receipt of an incoming cellphone call. A vehicle occupant can pick up the cellphone handset 83, if desired, and answer the incoming call. The tip-and-ring mechanism 117 stops "ringing" when the cellphone handset 83 goes off-hook, when the telephone used by the call originator goes on-hook before the cellphone handset 83 goes off-hook, or after a selected number N(termin) of rings (preferably in the range 10–20). If the incoming phone call contains no LD interrogation signal within the portion that arrives in the initial time interval of length $\Delta t_d$, the cellphone unit responds as a normal cellular phone would respond after this initial interval.

A vehicle occupant may decide to use the cellphone to make an outgoing cellphone call during the initial time interval of length $\Delta t_d$ after an incoming phone call is received. If the cellphone handset 83 goes off-hook during this initial time interval while an LD interrogation signal is being or has been received, the call interceptor 95 may respond in at least four ways: (1) the LD antenna present location information is loaded into an auxiliary memory 103, to be transmitted at a later time when the cellphone handset 83 is again on-hook, and a distinguishable abort signal is immediately transmitted to the originating station 37; or (2) the present location information for the LD signal antenna 91 is dumped, to be redetermined and transmitted at a later time when the cellphone handset 83 is again on-hook, and a distinguishable abort signal is immediately transmitted to the originating station 37; or (3) transmission of the LD antenna present location information to the originating station 37 is completed and the connection to the originating station is disengaged (requiring a time delay of at most 1–2 sec) before the cellphone responds to the vehicle occupant who wishes to make an outgoing cellphone call; or (4) the cellular phone appears disabled to the vehicle occupant, and transmission of the present location information to the originating station 37 continues, whether the cellphone handset 83 is off-hook or on-hook.

In the rare event that the cellphone handset 83 goes off-hook during the initial time interval of length $\Delta t_d$, and no portion of an LD interrogation signal has yet been received, any LD interrogation command signal C is squelched, and the vehicle occupant is allowed to attempt to complete a normal outgoing cellular phone call. If a normal incoming cellular phone call and an LD interrogation signal are received by the cellphone radio receiver at about the same time, at least one of these incoming phone calls will receive a conventional busy signal.

If the cellphone handset 83 goes off-hook shortly after the initial time interval of length $\Delta t_d$ begins, and a normal incoming cellular phone call is being received at that time (no LD interrogation signal is received), the cellphone radio unit may either (1) connect the incoming call or (2) squelch the, incoming call and allow the vehicle occupant to attempt an outgoing call, as in a conventional cellular phone response.

If a vehicle occupant initiates an outgoing cellular phone call or receives an incoming cellular phone call using the cellphone handset 83, the call interceptor 95 automatically causes the contact phone number to be recorded, using an activated DTMF tone recording device or other appropriate phone number recording device 106, in the memory unit 103. This occurs whether or not the outgoing or incoming cellular phone call connection is completed. If the outgoing or incoming cellular phone call connection is completed, the call interceptor 95 optionally activates a voice recorder 105A and also records the resulting phone conversation. This recorded phone conversation is reformatted and/or converted to digital signals by a reformatter and analog/digital conversion unit 105B and stored in digital form in the memory 103. The contact phone number(s) and/or the voice recording(s) of any resulting conversation using the cellphone can be played back when the vehicle is recovered. This recording of the contact phone number and/or of the phone conversation is performed if a recording switch 108 is in an activated state. If the switch 108 is in an inactivated state, no recording is made of a contact phone number or of a voice conversation engaged in using the cellphone. The recording switch 108 is concealed and known to the authorized user or owner of the vehicle, and this switch may be set in an activated or in an inactivated state by this person. Preferably, the recording switch 108 is activated in its default position.

Optionally, the voice recording module 105A, the DTMF tone recording module 106 or the memory unit 103 can transmit a recording advisory signal RA to the call interceptor 95, notifying the call interceptor that a contact phone number and/or voice communication has been recorded. The call interceptor 95 then optionally causes the cellphone receiver and transmitter 85 to transmit a phone call advisory message to the originating station 37, notifying the originating station that an outgoing phone call has been placed and/or completed using the cellular phone. The originating station 37 optionally responds with a recording response command signal, requesting that the recorded voice communication signal and/or the recorded telephone contact number be transmitted to the originating station. If the cellphone receiver and transmitter 85 and/or call interceptor 95 receive this recording response command signal, then the call interceptor transmits a recording command signal RC to the memory unit 103, commanding the memory unit to provide the recorded voice communication and/or the recorded telephone number. The memory unit 103 then transmits this recorded information RI on contact phone number and/or voice communication to the call interceptor 95, and the call interceptor optionally transmits this recorded information to the originating station 37, using the cellphone receiver and transmitter 85. If a vehicle occupant attempts to use the cellular phone to make an outgoing cellular phone call while this information exchange is proceeding, the LDR unit 81 can respond as it would respond where LD antenna present location information is being provided for the originating station 37 at the time a normal outgoing or incoming phone call is attempted.

Figure 6A:
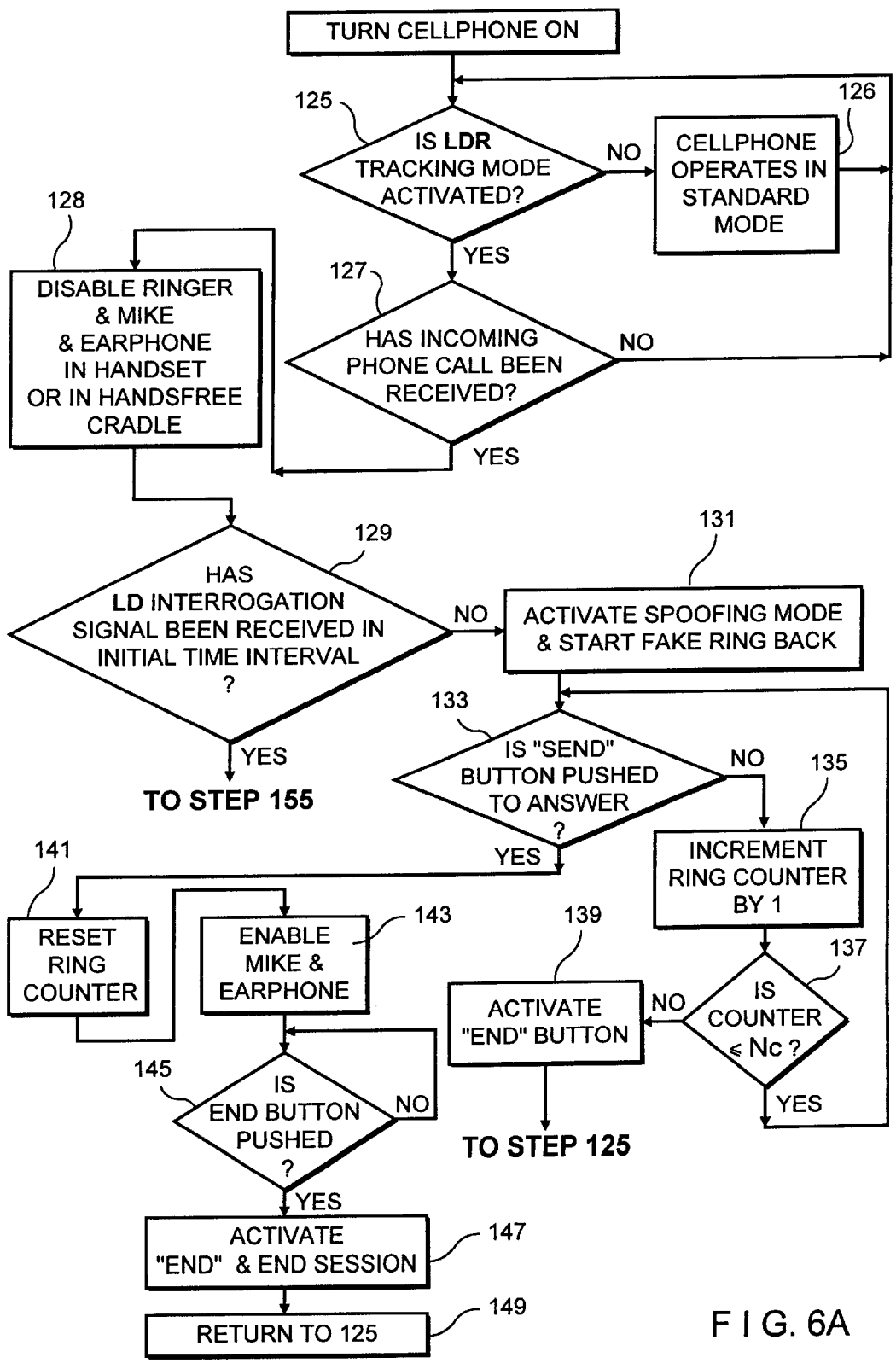
FIGS. 6A, 6B and 6C are a flow chart illustrating a procedure followed by an LDR unit according to an embodiment of the invention.
Figure 6B:
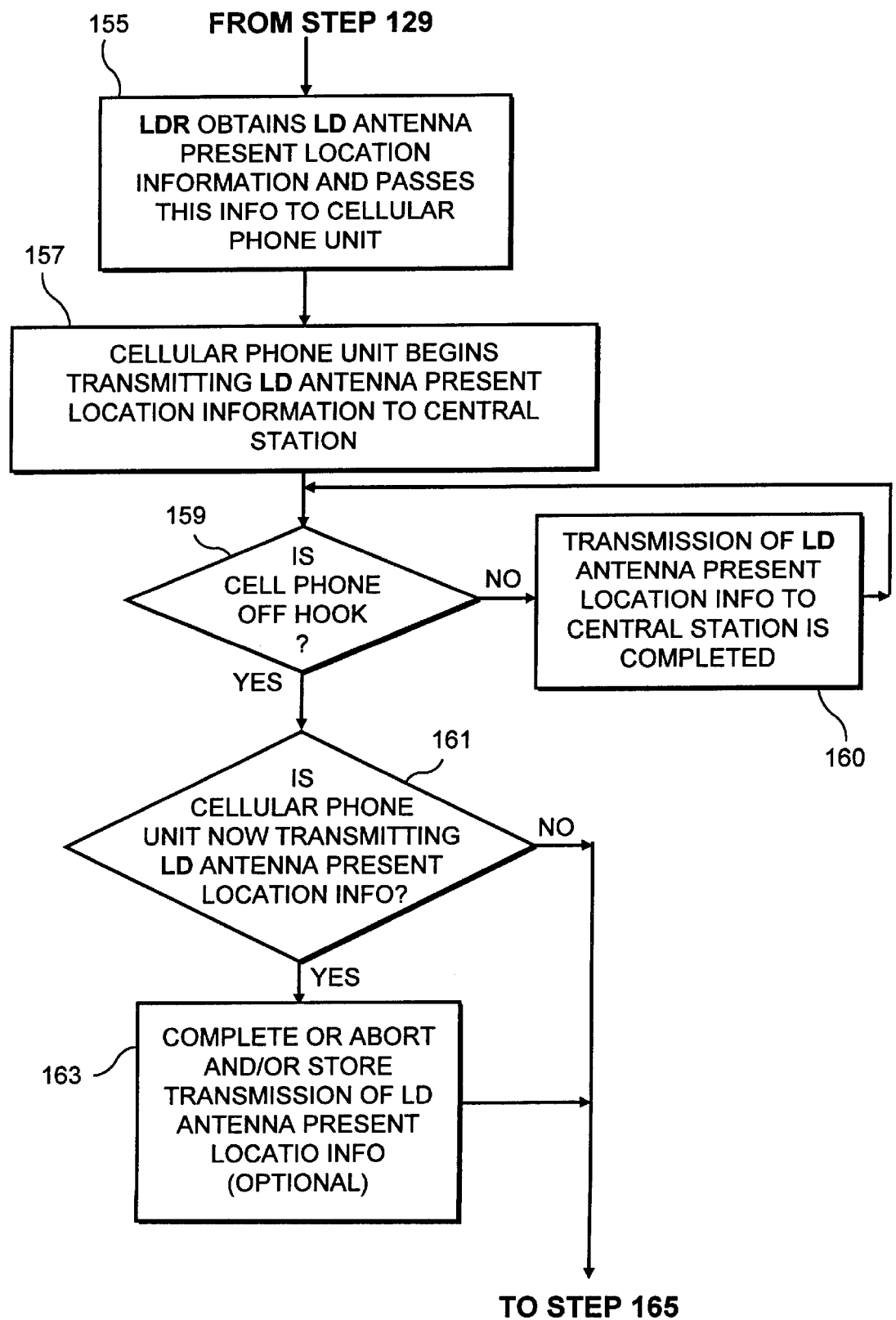
Figure 6C:
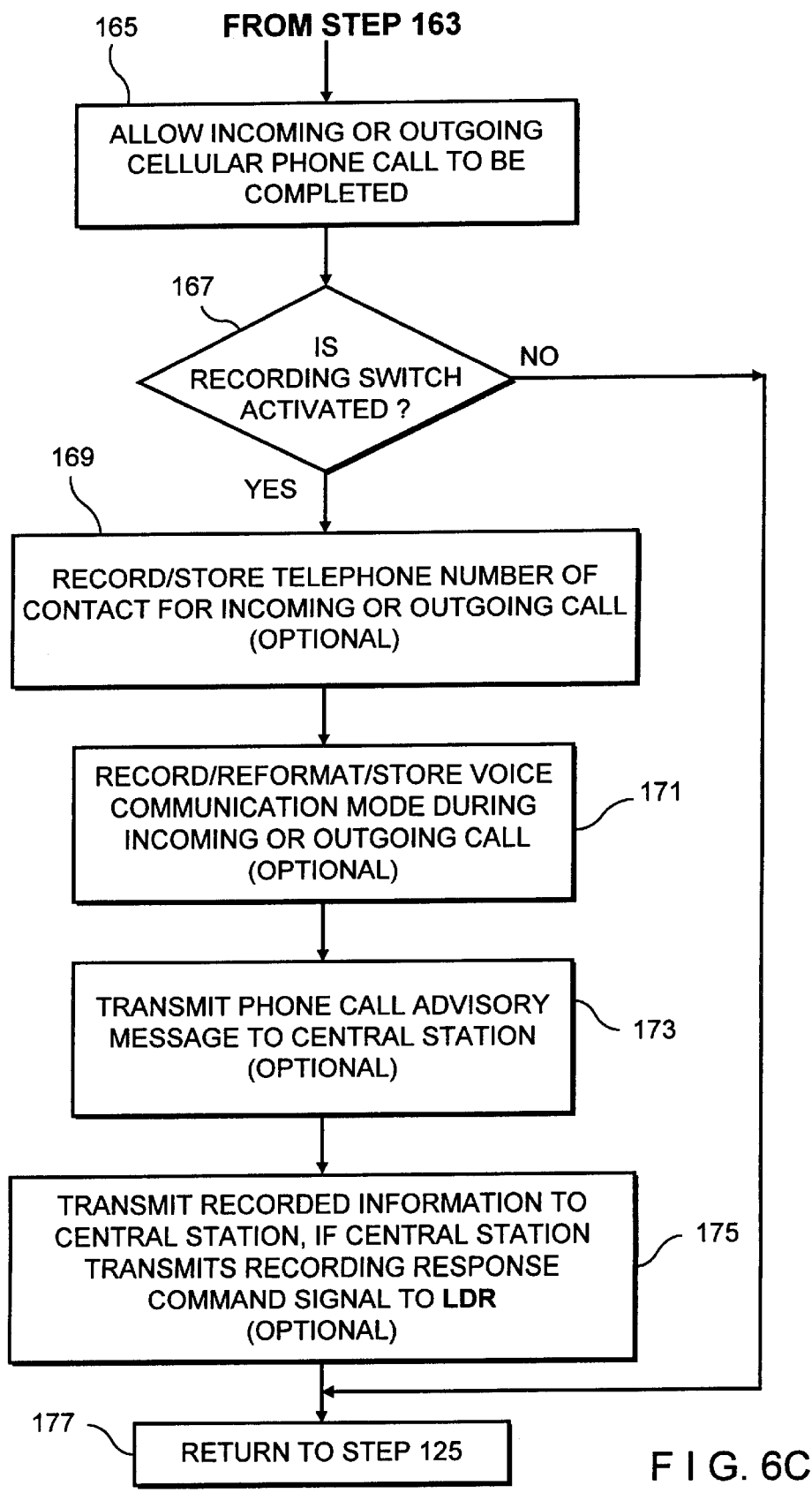

FIGS. 6A, 6B and 6C constitute a flow chart illustrating a procedure that may be followed by the disclosed apparatus carried on the vehicle according to this embodiment of the invention. In step 121, the LDR system turns the cellular phone on.

The system continues to step 125 and determines whether the LDR tracking mode is activated. If the answer to the question in step 125 is "no," the system optionally operates in a standard cellular phone mode, in step 126, and recycles to step 125.

If the answer to the question in step 125 is "yes," the system continues to step 127 and determines whether an incoming cellular phone call has been received. If the answer to the question in step 127 is "no," the system recycles to step 125.

If the answer to the question in step 127 is "yes," the system optionally disables normal cellphone handset operation (ringer, microphone, earphone), in step 128. The system determines, in step 129, whether an LD interrogation signal has been received within an initial time interval (of length $\Delta t_d$). If the answer to the question in step 129 is "no," the LDR system activates a spoofing mode in step 131 and provides a simulated ringback for the caller. In step 133, the system determines whether the cellular phone "send" button is pushed or activated to allow a vehicle occupant to answer the incoming call. If the answer to the question in step 133 is "no," the system increments the ringback counter number by 1 (n>n+1), in step 135, and inquires whether the ringback counter number satisfies $n \leq N$, in step 137. If the answer to the question in step 137 is "no," the system activates a cellular call END switch, in step 139, and the incoming cellular call ends.

If the answer to the question in step 133 is "yes," the system resets the ringback counter in step 141 and enables the cellular phone microphone and earphone in step 143, to allow a vehicle occupant to respond to the incoming cellular phone call. In step 145, the system then determines whether the END button on the cellular phone has been pushed or activated, indicating that the incoming call session is terminated. If the answer is "no," the system continues to recycle through step 145 until the answer is "yes." When the answer to the question in step 145 is "yes," the system activates an END session switch, terminates the incoming call session in step 147, and, in step 149, returns to step 125.

If the answer to the question in step 129 is "yes," the system proceeds to step 155 (FIG. 6B). Here, the LDR unit has received an LD interrogation signal in the initial time interval. The LDR unit obtains present location information for the LD signal antenna and passes this information to the cellular phone unit in step 155. In step 157, the cellular phone unit begins transmitting this LD antenna present location information to the originating station 37, for analysis and/or further processing to determine the present location of the missing vehicle. If nothing intervenes (i.e., as long as the phone does not go off-hook and no call comes in) the LDR unit completes its transmission of the LD antenna present location information to the originating station 37 (step 160).

If a vehicle occupant picks up the cellular phone handset (cellular phone goes off-hook), indicating an intention to make an outgoing call using the cellular phone, or if the cellular phone unit receives another incoming call that is not from the originating station 37, as in step 159, the LDR unit determines, in step 161, whether the cellular phone unit is presently transmitting LD antenna present location information to the originating station. If the answer is "no" in step 161, the cellular phone unit operates normally and allows the incoming or outgoing phone call to be completed, in step 165 (FIG. 6C).

If the answer to the question in step 161 is "yes," in step 163 the system (1) completes this transmission (if this transmission can be completed within a selected time $\Delta t_{tr}$ of the order of 50–200 msec) or (2) aborts this transmission of present location information by the cellular phone unit or (3) stores the LD antenna present location information for possible future transmission. In any of the se optional responses in step 163, the system then proceeds to step 165 and allows the incoming or outgoing phone call to be completed. Optionally, the cellular phone unit can respond as though it were disabled so that a vehicle occupant cannot receive an incoming call and/or cannot complete an outgoing call, and the LD antenna present location information can be transmitted without regard to another incoming call or attempted outgoing call. Optionally, the present location information whose transmission was aborted is stored by the LDR for subsequent transmission.

In step 167, the system determines whether a recording switch is activated. If the recording switch is not activated, the system does not record any information on an incoming call or an outgoing call using the cellular phone unit. If the recording switch is activated, the system optionally records and stores the telephone number for the contact for this incoming or outgoing call, in step 169. If the recording switch is activated, the LDR unit optionally records, reformats and stores the voice communication for this incoming or outgoing call, in step 171.

In step 173, after completion of this incoming or outgoing call by a vehicle occupant, the system optionally transmits a phone call advisory signal to the originating station 37, indicating that a voice communication and/or phone contact number has been recorded for an incoming or outgoing call. If the LDR unit receives a recording response command signal from the originating station 37, this recorded information is optionally transmitted to the originating, station, in step 175. The system then returns to step 125 (step 177).

The LD unit 15 or 54 used in FIG. 1 or FIG. 4 to determine its own location, or the present location of an associated LD antenna, on the vehicle 11 or 51 may be part of a satellite-based LD system, such as the Navstar Global Positioning System (GPS), the Global Orbiting Navigational Satellite System (GLONASS), or another Satellite Positioning System (SATPS). Alternatively, the LD unit may be part of a ground-based LD system, such as Loran, Omega, Decca, Tacan, JTIDS Relnav, PLRS or a similar system. Alternatively, the LD unit may be part of an FM subcarrier signal system.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

What is claimed is:

1. Apparatus for determining and reporting the present location of a missing vehicle, the apparatus comprising:
  a location determination (LD) unit, including an LD signal antenna and LD receiver/processor, positioned on a vehicle to receive LD signals and to process these LD signals;
  a cellular phone unit positioned on the vehicle and comprising:
    a cellular phone transceiver and antenna that receive incoming cellular signals at a signal port on an incoming cellular channel and that transmit outgoing cellular signals from the signal port on an outgoing cellular channel at a selected frequency to a central station that is spaced apart from the cellular phone transceiver, that receive incoming cellular signals from the central station and that issue these signals as electronic signals at the signal port, and that can generate and issue a perceptible incoming call signal that indicates when the transceiver and antenna are receiving an incoming cellular signal intended for that transceiver, where the cellular phone transceiver and antenna are capable of receiving and responding to an LD interrogation signal from the central station that requests information on the present location of the LD antenna; and
    a cellular phone handset that receives electronic signals from the cellular phone signal port and delivers electronic signals to the cellular signal port; and
  a controller, positioned on the vehicle, connected to and selectively controlling and acting as an interface between the LD unit and the cellular phone unit, for passing signals between the LD unit and the cellular phone unit, wherein (i) when the cellular phone unit receives an incoming cellular call, the controller causes the cellular phone unit to delay issuance of an incoming call signal for a selected initial time interval of length $\Delta td$; (ii) when the cellular phone unit receives an LD interrogation signal during an initial time interval of length $\Delta td$ as part of the incoming cellular call, the controller causes the cellular phone unit not to issue an incoming cellular phone call signal indicating receipt of an incoming phone call, causes the LD unit to provide the cellular phone unit with information on the present location of the LD antenna, and causes the cellular phone transceiver and antenna to transmit this LD unit present location information to the central station; and (iii) when the cellular phone unit does not receive an LD interrogation signal during an initial time interval of length $\Delta td$ as part of the incoming cellular call, the controller causes the cellular phone unit to operate as a normal cellular phone and to issue an incoming cellular phone call signal that is perceptible by an occupant of the vehicle.

2. The apparatus of claim 1, wherein said incoming cellular channel and said outgoing channel are part of a first cellular channel.

3. The apparatus of claim 2, wherein said transceiver and antenna receive said LD interrogation signal on said first cellular channel.

4. The apparatus of claim 2, wherein said transceiver and antenna receive said LD interrogation signal on a second cellular channel.

5. The apparatus of claim 4, wherein said transceiver on said first cellular channel and on said second cellular channel operate independently of each other so that a vehicle occupant within said vehicle can use said transceiver on said second cellular channel to communicate with another person or facility at another location, at the same time said transceiver is responding to said LD interrogation signal on said first cellular channel.

6. The apparatus of claim 1, wherein, when said incoming cellular phone unit does not receive an LD interrogation signal during an initial time interval of length $\Delta td$ as part of said incoming cellular phone call, said controller causes said cellular phone unit to issue an incoming call signal for said vehicle occupant, indicating receipt of an incoming cellular phone call by said cellular phone unit, until said cellular handset goes off-hook or the calling party disconnects or the incoming cellular phone call signal is issued a selected number of times.

7. The apparatus of claim 1, further comprising a cellular unit cradle, positioned on said vehicle and including a microprocessor, that accepts and holds said cellular unit and said controller, wherein said cellular unit is optionally detachable from the cellular unit cradle and can receive said incoming cellular calls and said LD interrogation signals and can transmit said outgoing cellular calls while said cellular unit is detached from the cellular unit cradle and while said cellular unit is attached to the cellular unit cradle.

8. The apparatus of claim 7, wherein said cellular unit cradle does not hold said LD unit and said LD unit and said controller are electrically connected when said cellular phone unit is accepted by and attached to said cellular unit cradle.

9. The apparatus of claim 7, wherein said cellular cradle unit further accepts and holds said LD unit.

10. The apparatus of claim 1, wherein at least one of said LD unit and said controller is hidden from view on said vehicle.

11. The apparatus of claim 1, wherein, when a vehicle occupant within the vehicle uses said cellular phone unit to communicate with an other person or facility at another location, said cellular phone unit operates as a normal cellular phone and allows the vehicle occupant to communicate with that other person or facility, if said cellular phone unit is not responding to said LD interrogation signal at the time the vehicle occupant uses said cellular phone unit.

12. The apparatus of claim 1, further comprising activatable recording means and a recording switch that activates and deactivates the recording means, connected to said transceiver, for recording and storing at least one of (i) a contact phone number for an incoming call or outgoing call using said transceiver and (ii) a voice communication, which uses said transceiver, between said vehicle occupant and said other person or facility, when the recording means is activated.

13. The apparatus of claim 12, wherein said recording means in an activated state causes said transceiver to transmit a recording advisory signal to said central station, indicating that said transceiver has been used for an incoming call or outgoing call, if at least one voice communication or phone number has been recorded by said recording means.

14. The apparatus of claim 13, wherein said transceiver is capable of receiving from said central station a recording interrogation signal, in response to receipt by said central station of said recording advisory signal, the apparatus further comprising stored message transmission means, connected to said recording means and to said transceiver, for obtaining information on at least one of (i) said contact phone number and (ii) said voice communication, stored in said recording means, and for transmitting this information to said central station when said transceiver receives a recording response command signal from said central station.

15. The apparatus of claim 1, further comprising a message storage memory, connected to said controller, wherein, when a vehicle occupant uses said transceiver to communicate with an other person or facility at another location on said second cellular channel while said apparatus is receiving or is responding to said LD interrogation signal on said first cellular channel, said transceiver will abort its response to said LD interrogation signal, will store said LD unit present location information in the message storage memory, will operate as a normal cellular phone on said second cellular channel and will allow the vehicle occupant to contact the called person or facility.

16. The apparatus of claim 15, wherein said controller further comprises stored message transmission means, for retrieving said LD unit present location information from said message storage memory and for causing said transceiver to transmit said LD antenna present location information to said central station, after said cellular phone handset has returned to an on-hook condition.

17. The apparatus of claim 1, wherein said transceiver transmits an abort signal to said central station, if said transceiver's response to said LD interrogation signal is aborted before this response is completed.

18. The apparatus of claim 1, wherein, when an occupant of the vehicle uses said transceiver to communicate with an other person or facility at another location on said second cellular channel while said transceiver is receiving or is responding to said LD interrogation signal on said first cellular channel, said transceiver will abort its response to said LD interrogation signal, will operate as a normal cellular phone on said second cellular channel and will allow the vehicle occupant to communicate with the other person or facility.

19. The apparatus of claim 1, wherein, when an occupant of the vehicle uses said transceiver to communicate with an other person or facility at another location on said second cellular channel while said transceiver is receiving or is responding to said LD interrogation signal on said first cellular channel, said transceiver will complete the transmission of its response to said LD interrogation signal, will then operate as a normal cellular phone and will allow the vehicle occupant to communicate with the other person or facility.

20. The apparatus of claim 1, wherein, when an occupant of the vehicle uses said transceiver to communicate with an other person or facility at another location on said second cellular channel while said transceiver is receiving or is responding to said LD interrogation signal on said first cellular channel, said transceiver will behave as if it is disabled so that the vehicle occupant will be unable to complete a phone call connection using said transceiver.

21. The apparatus of claim 1, wherein said time interval length $\Delta td$ lies in the range of about 0.2–30 sec.

22. The apparatus of claim 1, wherein said time interval length $\Delta td$ lies in the range of about 1–5 sec.

* * * * *